United States Patent
Gooden

(10) Patent No.: US 10,132,401 B2
(45) Date of Patent: Nov. 20, 2018

(54) THERMOSTATIC BYPASS VALVE

(71) Applicant: Ford Global Technologies, LLC, Dearborn, MI (US)

(72) Inventor: James Thomas Gooden, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 253 days.

(21) Appl. No.: 15/207,620

(22) Filed: Jul. 12, 2016

(65) Prior Publication Data

US 2018/0017155 A1   Jan. 18, 2018

(51) Int. Cl.
*F01M 5/00* (2006.01)
*F16H 57/04* (2010.01)
*F01P 7/16* (2006.01)
*G05D 23/02* (2006.01)

(52) U.S. Cl.
CPC ......... *F16H 57/0435* (2013.01); *F01M 5/002* (2013.01); *F01M 5/007* (2013.01); *F01P 7/16* (2013.01); *F16H 57/04* (2013.01); *F16H 57/0417* (2013.01); *G05D 23/022* (2013.01)

(58) Field of Classification Search
CPC . F01M 5/002; F01M 5/007; F01P 7/16; F16H 57/0417; F16H 57/0435; G05D 23/022
See application file for complete search history.

(56) References Cited

U.S. PATENT DOCUMENTS

| | | | |
|---|---|---|---|
| 3,404,837 A | 10/1968 | James | |
| 6,499,666 B1 * | 12/2002 | Brown | F01M 5/007 236/34.5 |
| 8,123,143 B2 | 2/2012 | Willers et al. | |
| 8,141,790 B2 | 3/2012 | Sheppard | |
| 2002/0148416 A1 * | 10/2002 | Cohen | F01P 7/16 123/41.1 |
| 2003/0136855 A1 * | 7/2003 | Brown | F01M 5/007 236/101 R |
| 2006/0005789 A1 * | 1/2006 | Miura | F01P 7/16 123/41.1 |
| 2009/0026405 A1 * | 1/2009 | Sheppard | F16K 15/06 251/364 |
| 2015/0211395 A1 * | 7/2015 | Gooden | F01M 5/007 165/280 |
| 2015/0315941 A1 * | 11/2015 | Kim | F01M 5/007 236/34.5 |

* cited by examiner

*Primary Examiner* — Jonathan Bradford
(74) *Attorney, Agent, or Firm* — James Dottavio; Brooks Kushman P.C.

(57) ABSTRACT

A thermostatic bypass valve has an intentional flow resistance through a bypass passageway when fluid is at a normal operating temperature. This flow resistance, of between 10 and 20 psi at a flow rate of 10 liters per minute, is achieved by limiting a radial clearance within the bypass passageway to less than 1.0 mm. The flow rate through the bypass passageway is at least half of the flow resistance of the cooler. This bypass flow resistance is beneficial because it limits the flow rate of lubrication fluid during bypass, reducing the parasitic losses of the gearbox.

19 Claims, 6 Drawing Sheets

THERMOSTATIC BYPASS VALVE

TECHNICAL FIELD

This disclosure relates to the field of transmission hydraulic controls. More particularly, the disclosure pertains to thermostatic bypass valve.

BACKGROUND

FIG. 1 illustrates a vehicle powertrain. Heavy lines indicate mechanical power flow whereas thin lines indicate flow of transmission fluid. Engine 10 drives torque converter 12 which, in turn, drives gearbox 14. Gearbox 14 may adjust the speed and torque before transmitting the mechanical power to an output shaft. The gear ratio of gearbox 14 is selected by providing pressurized fluid to hydraulically actuated clutches. Pump 16, driven mechanically by engine 10, draws fluid from sump 18. Valve body 20 routes the pressurized fluid to the torque converter and to the clutches within gearbox 14 that establish the desired gear ratio. The fluid also provides lubrication to gearbox 14 and absorbs heat. The fluid then returns to sump 18.

The transmission operates most efficiently when the fluid is at an optimal temperature. When the fluid is too cold, its viscosity is higher increasing parasitic drag. If the fluid gets too hot, the viscosity is too low resulting in increased leakage around the pump and elsewhere. This increased leakage reduces the pressure available from pump 16 reducing the torque capacity of the clutches within gearbox 14. If the fluid temperature remains high for a sufficient period of time, the friction characteristics of the clutches change and shift quality degrades. The temperature of the fluid is controlled by routing the lubrication fluid through cooler 22 and bypass valve 24. The cooler is a heat exchanger with a fluid loop designed to facilitate heat transfer either directly to ambient air, or to an intermediate medium such as liquid coolant. When the fluid temperature is high, lubrication fluid is routed through cooler 22 before entering the gearbox 14. When the fluid temperature is low, on the other hand, bypass valve 24 routes the fluid directly to gearbox 14 bypassing the cooler and thus permitting the fluid to warm up quicker. Note that, although valve body 20 and bypass valve 24 are illustrated in FIG. 1 as distinct components, some embodiments may integrate bypass valve 24 into the valve body.

Bypass valve 24 receives fluid from a pressure circuit 26 in valve body 20. The pressure in pressure circuit is maintained at a sufficient pressure to force fluid through the bypass valve, cooler, and lubrication circuit 28 at a sufficient flow rate to provide adequate lubrication and heat dissipation. For example, the pressure circuit 26 may be fluidly connected to a torque converter return circuit. When the temperature of the fluid is low, bypass valve 24 fluidly connects pressure circuit 26 to lubrication circuit 28. Hydraulic circuits are fluidly connected when there is a pathway between the circuits that doesn't have any intentional or large flow restrictions, such that the two circuits are at substantially the same pressure. Hydraulic circuits may be separated by pumps or by orifices, of fixed or variable size, that are intended to create pressure differentials between the circuits. Bypass valve 24 may also block flow through the cooler when the fluid temperature is low. Even if the flow is not blocked, the vast majority of the fluid bypasses the cooler due to the cooler's flow resistance. When the fluid is above the optimal temperature, bypass valve isolates pressure circuit 26 from lubrication circuit 28, fluidly connects pressure circuit 26 to cooler supply circuit 30, and fluidly connects cooler return circuit 32 to lubrication circuit 28. This forces the fluid to flow through the cooler.

SUMMARY OF THE DISCLOSURE

A transmission system includes a heat exchanger, a valve body, and a bypass valve. The heat exchanger has a first flow resistance between an inlet and an outlet. The valve body has a pressure circuit, such as a torque converter return circuit, and a lubrication circuit. When a fluid temperature is equal to a first threshold, corresponding to a normal operating temperature, the bypass valve blocks flow from the outlet to the lubrication circuit and permits flow from the pressure circuit to the lubrication circuit via a bypass passageway. In this condition, the bypass passageway has a second flow resistance that is greater than half of the first flow resistance. This flow resistance may be created, for example, by a radial clearance less than 1.0 mm. When the fluid temperature exceeds a second threshold greater than the first threshold, the bypass valve blocks flow via the bypass passageway, fluidly connects the pressure circuit to the inlet of the heat exchanger, and fluidly connects the outlet of the heat exchanger to the lubrication circuit.

A transmission system includes a pressure circuit, a lubrication circuit, a cooler, and a bypass valve. The pressure circuit may be a torque converter return circuit. The bypass valve routes fluid from the pressure circuit to the lubrication circuit via the cooler when a fluid temperature exceeds a temperature threshold and routed the fluid via a bypass passageway when the fluid temperature is less than the threshold. The bypass passageway defines a radial clearance less than 1.0 mm when the fluid temperature is equal to the threshold. The flow resistance of the bypass passageway, when the fluid temperature is equal to the threshold, may be greater than half the flow resistance of the cooler. For example, this flow resistance may be between 10 and 20 psi at a flow rate of 10 liters per minute of transmission fluid at normal operating temperature.

A method of cooling a transmission includes routing fluid to a lubrication circuit via a cooler in response to a fluid temperature exceeding a first threshold and via a bypass passageway in response to the fluid temperature being less than the first threshold. The bypass passageway defines a radial clearance less than 1.0 mm when the temperature is equal to the first threshold. The radial clearance may result in a flow resistance through the bypass passageway of more than half the flow resistance of the cooler. The method may also block all fluid flow via the cooler when the temperature is less than a second threshold less than the first threshold. The method may also block all fluid flow via the bypass passageway when the temperature is greater than a third threshold greater than the first threshold.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The rate at which fluid flows through a given passageway is a function of the geometry of the passageway, the pressure difference between the ends of the passageway, and the fluid viscosity. The viscosity of transmission fluid is strongly impacted by temperature. The geometry of a passageway is characterized by a flow resistance which is the pressure required to force fluid at a reference viscosity through the passageway at a reference flow rate. Conventionally, bypass valves are designed to minimize flow resistance through the bypass passageway. A flow resistance less than 1 psi for a flow rate of 10 liters per minutes of transmission fluid at normal operating temperature is typical.

A sufficient flow rate is required in the lubrication circuit in order to keep moving parts coated and to dissipate heat. The pressure in pressure circuit 26 is maintained high enough to ensure that the lubrication flow rate is sufficient in all operating conditions. As the flow rate in the lubrication circuit increases, parasitic drag of gearbox 14 increases, reducing fuel economy. Therefore, it is desirable to avoid an excessive lubrication flow rate. When the fluid is cold, such as after the vehicle has soaked in cold ambient temperatures, the lubrication flow rate tends to be low due to the high viscosity of the fluid. With typical bypass valve geometry, the flow rate increases as the fluid warms up because the flow resistance is nearly constant and the viscosity decreases. When the bypass valve changes state and routes fluid to through cooler 22, the flow rate decreases due to the flow resistance of the cooler. In order to ensure sufficient flow when the fluid is either cold or hot, the flow tends to be excessive when the fluid is near its normal operating temperature.

Figure 1:
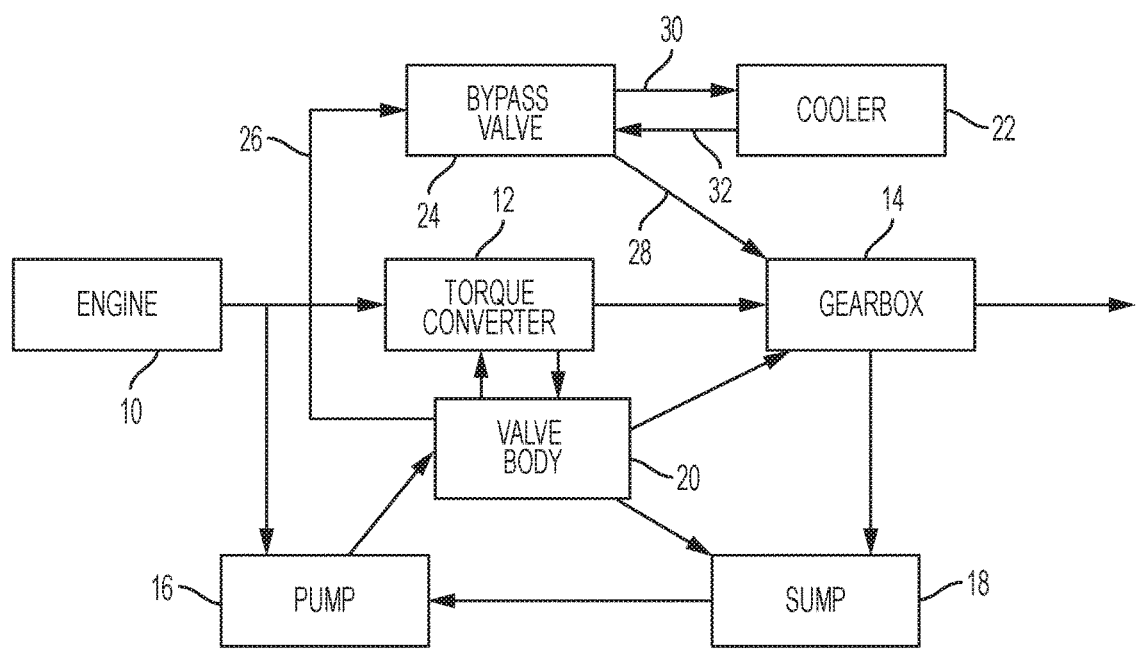
FIG. 1 is a schematic representation of a vehicle powertrain.
Figure 2:
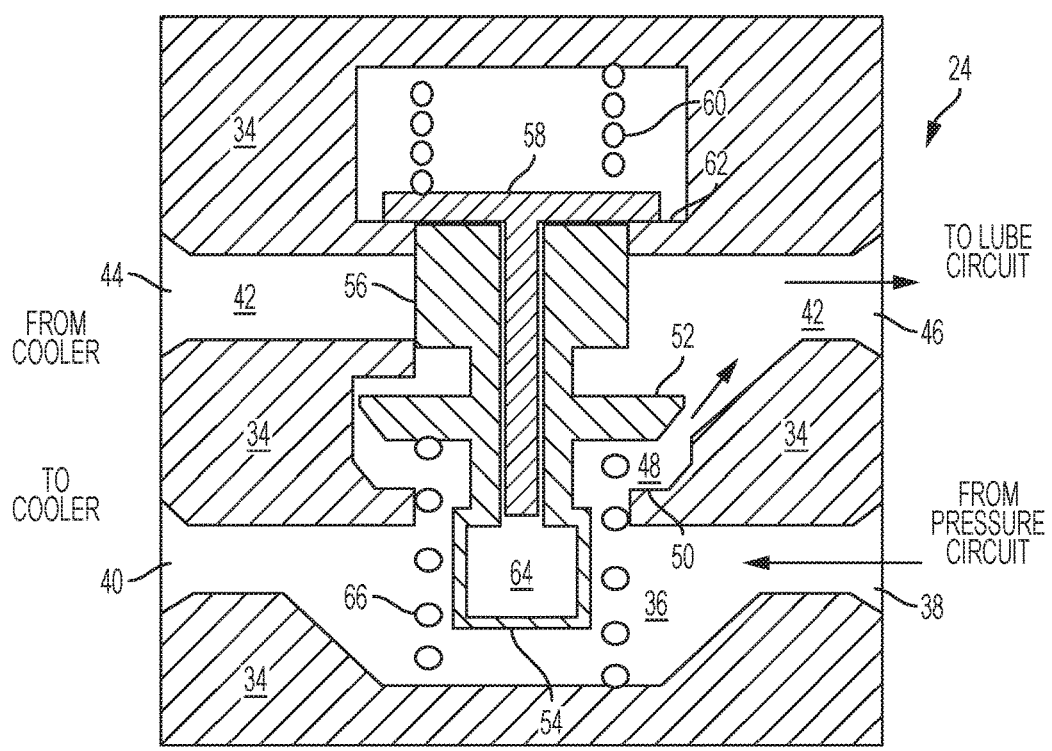
FIG. 2 is a diagram showing a thermostatic bypass valve when the fluid is cold.

FIGS. 2-5 illustrates a bypass valve designed to regulate lubrication fluid temperature and flow rate. FIG. 2 shows bypass valve 24 when the fluid is cold. The bypass valve includes a housing 34 with three passageways. Source passageway 36 conducts pressurized fluid from port 38 to port 40. Port 38 receives fluid from pressure circuit 26 (FIG. 1). Port 40 sends fluid to the cooler via circuit 30 (FIG. 1). Similarly, return passageway 42 conducts cooled fluid from port 44 to port 46. Port 44 receives fluid returning from the cooler via circuit 32 (FIG. 1). Port 44 sends fluid to lubrication circuit 28 (FIG. 1). Bypass passageway 48 conducts fluid from source passageway 36 to return passageway 42, bypassing the cooler fluid loop. Bypass passageway 48 is defined between valve seat 50 and poppet 52. When poppet 52 is displaced away from valve seat 50, as shown in FIG. 2, fluid can flow through the bypass passageway 48 between valve seat 50 and poppet 52. Poppet 52 is rigidly attached to cylinder 54 which is supported to move within bypass passageway 48. Cylinder 54 also includes a face 56 that blocks return passageway 42 when Cylinder 54 is in the position illustrated in FIG. 2.

Piston 58 slides within cylinder 54. Under normal operating conditions, pressure relief spring 60 pushes piston 58 against lip 62 in housing 34. Wax is contained within chamber 64 that is formed by cylinder 54 and piston 58. Cylinder 54 is designed such that chamber 64 is thermally immersed in source passageway 36. In other words, based on the location of the chamber and the thermal conductivity of the materials, the temperature of the wax is determined primarily by the temperature of fluid within the source passageway. The temperature of fluid in the return passageway has much less, if any, impact on the temperature of the wax. The wax is formulated to have a melting point that corresponds to the desired operating temperature of the transmission fluid. Spring 66 pushes poppet 52 toward the return passageway to the extent that the volume of wax in chamber 64 permits it to move. The spring rates of springs 60 and 66 are selected such that the force exerted by spring 60 exceeds the force exerted by spring 66. When the wax is solid, its volume is relatively low, permitting poppet 52 to move away from valve seat 50 to open up bypass passageway 48 and forcing face 56 to block return passageway 42. In this condition, all fluid flows from the pressure circuit, through bypass passageway 48, to the lubrication circuit without flowing through the cooler. The flow resistance of bypass passageway 48 in the cold condition illustrated in FIG. 2 is relatively low. Consequently, the flow rate is adequate for lubrication needs even though the viscosity may be relatively high.

Figure 3:
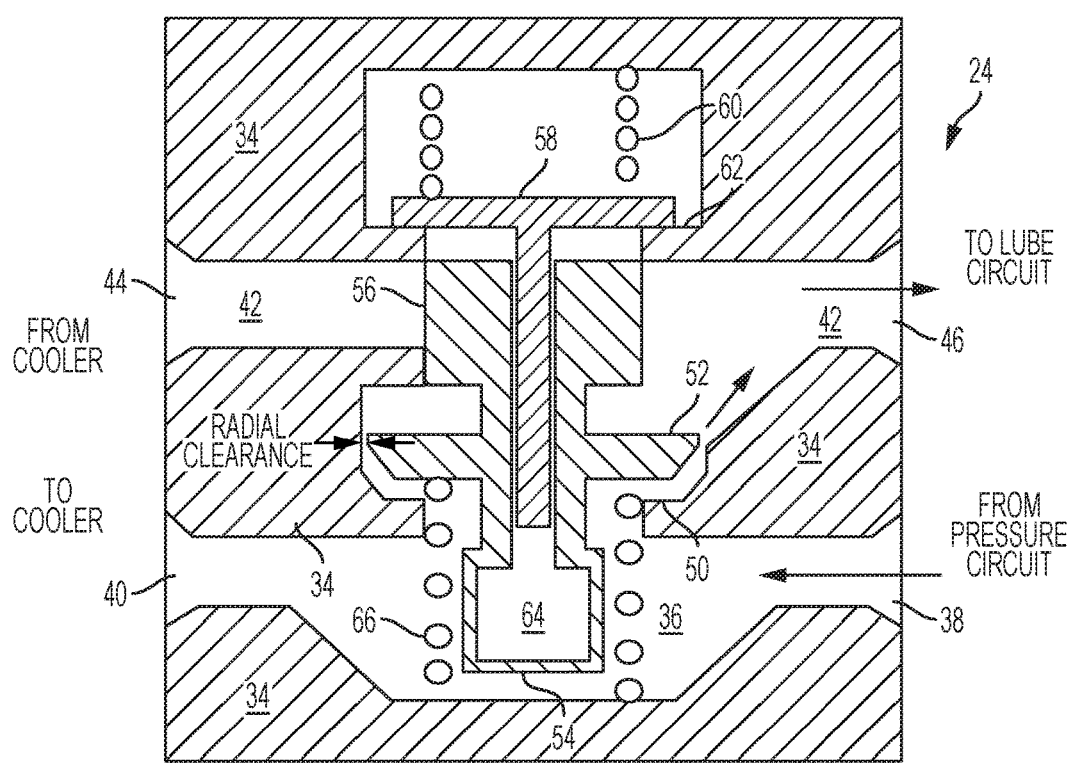
FIG. 3 is a diagram showing a thermostatic bypass valve when the fluid is at a normal operating temperature.

FIG. 3 shows bypass valve 24 when the fluid has reached a normal operating temperature. Because the wax in chamber 64 is thermally immersed in source passageway 36, some of the wax melts. Wax increases substantially in volume when it melts. Therefore, the volume of chamber 64 increases forcing cylinder 54 to slide relative to piston 58, overcoming return spring 66. Piston 58 is restrained from moving by pressure relief spring 60, which acts in compression. Cylinder 54 moves toward source passageway 36 forcing poppet 52 toward valve seat 50. This reduces the cross sectional area of bypass passageway 48, increasing the flow resistance. Specifically, there is a radial clearance between the poppet 52 and the housing 34 that restricts the flow. The inventor has determined that a radial clearance between 0.5 mm and 1.0 mm produces a desirable flow restriction between 10 and 20 psi for 10 liters per minute of flow at the viscosity of transmission fluid at normal operating temperature. At the normal operating temperature as illustrated in FIG. 3, the flow resistance of bypass passageway 48 is at least half the flow resistance of cooler 22 (FIG. 1). The increasing flow resistance acts to reduce the flow rate as temperature increases while decreasing fluid viscosity acts to increase the flow rate as temperature increases. Overall, flow rate may slightly increase as temperature increases, but at a much lower gradient than if the flow resistance remained constant. Consequently, the flow rate remains very close to the level needed for lubrication and heat dissipation. Higher flow rates, which would result in increased transmission drag and decreased fuel economy, are avoided.

Figure 4:
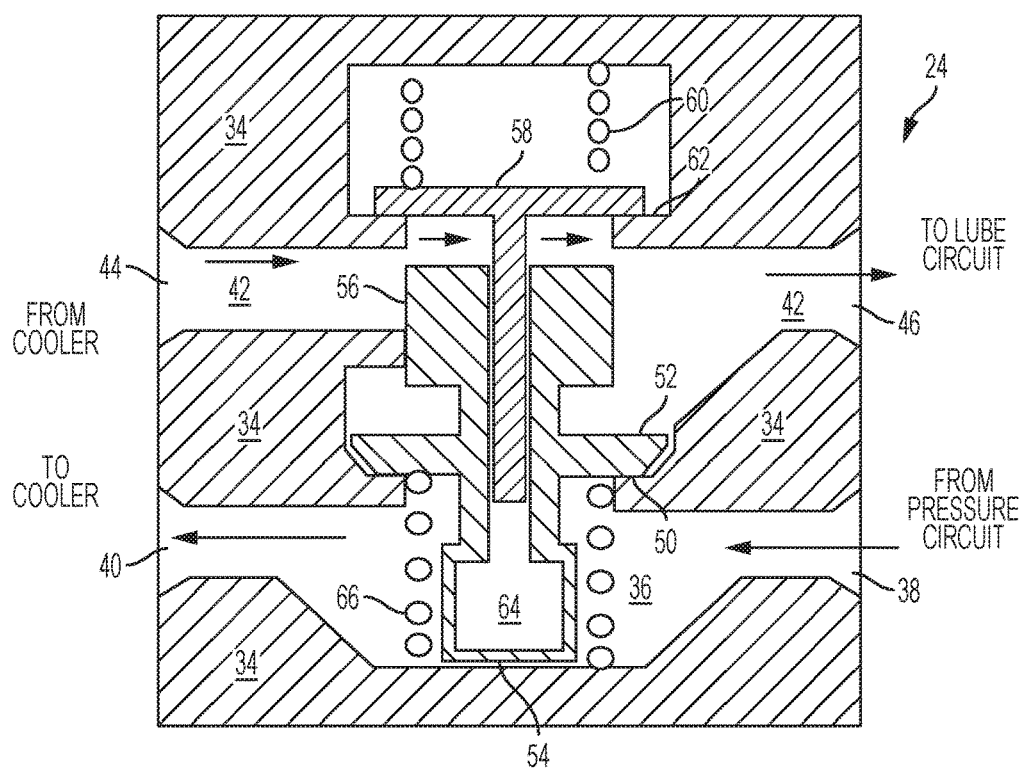
FIG. 4 is a diagram showing a thermostatic bypass valve when the fluid is hot.

FIG. 4 shows bypass valve 24 after the temperature has increased further. Once the temperature exceeds the normal operating temperature, surface 56 no longer completely blocks return passageway 42. As the temperature increases, the gap increases such that the flow resistance of the return passageway becomes small. At the temperature illustrated in FIG. 4, poppet 52 is forced into contact with valve seat 50 blocking all flow through bypass passageway 48. All fluid flows through source passageway 36, through cooler 22 (FIG. 1), and then returns to the lubrication circuit through return passageway 42. Because the flow resistance through the cooler is less than the flow resistance of bypass passageway 48 at normal operating temperature, the flow rate increases as the temperature increases above normal operating temperature. This increasing flow rate compensates for the decreased lubricating ability and heat absorbing ability of the warmer fluid, maintaining adequate lubrication and heat removal.

Figure 5:
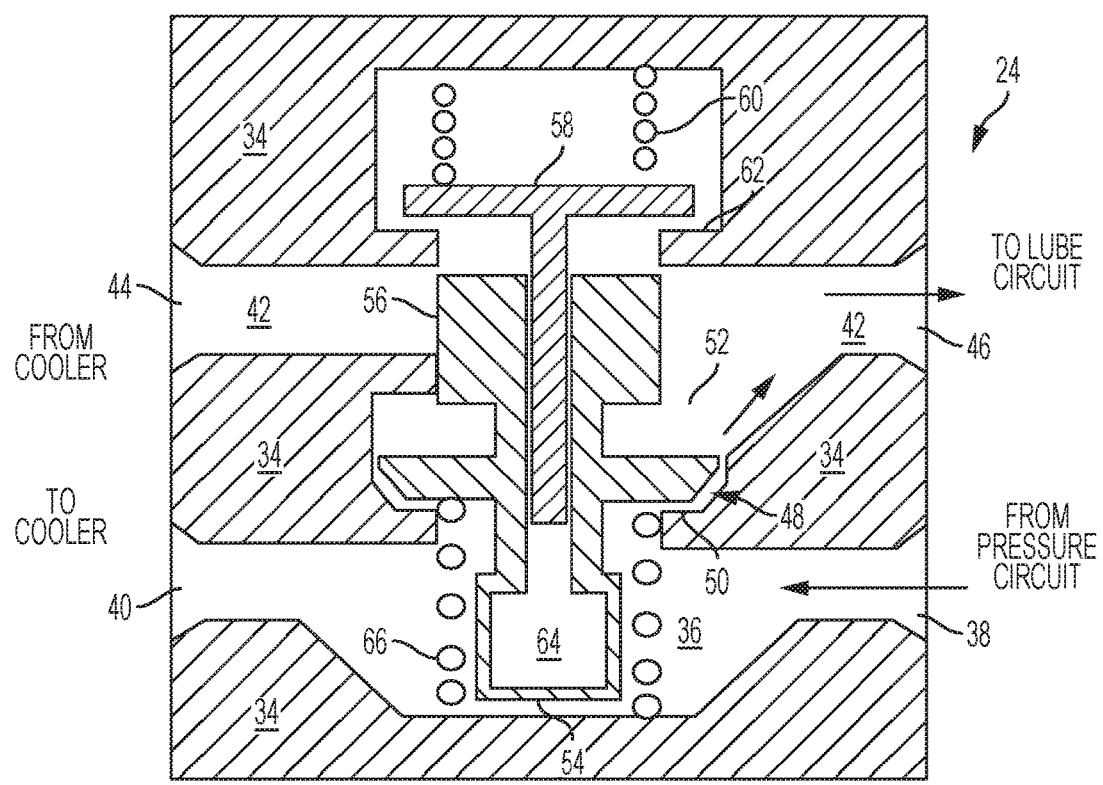
FIG. 5 is a diagram showing a thermostatic bypass valve when the cooler fluid loop is blocked.

FIG. 5 shows bypass valve 24 when the fluid is hot and the cooler fluid loop is blocked. Although pressure relief spring 60 continues to push poppet 52 toward valve seat 50, this force is overcome by a pressure difference between source passageway 36 and return passageway 42. The pressure difference displaces poppet 52 from valve seat 50 permitting fluid to flow through the bypass passageway 48. The pressure difference is determined by the force generated by pressure relief spring 60 and the area of poppet 52. These parameters are selected such that this feature is only activated when the resistance through the cooler fluid loop is excessive. If the blockage of the cooler fluid loop is only a partial blockage, then a fraction of the fluid will continue to flow through the cooler. If the partial blockage is caused by low temperatures, this flow of hot fluid will relieve the blockage. In the meantime, the transmission is provided with adequate lubrication flow at acceptable pressure.

Figure 6:
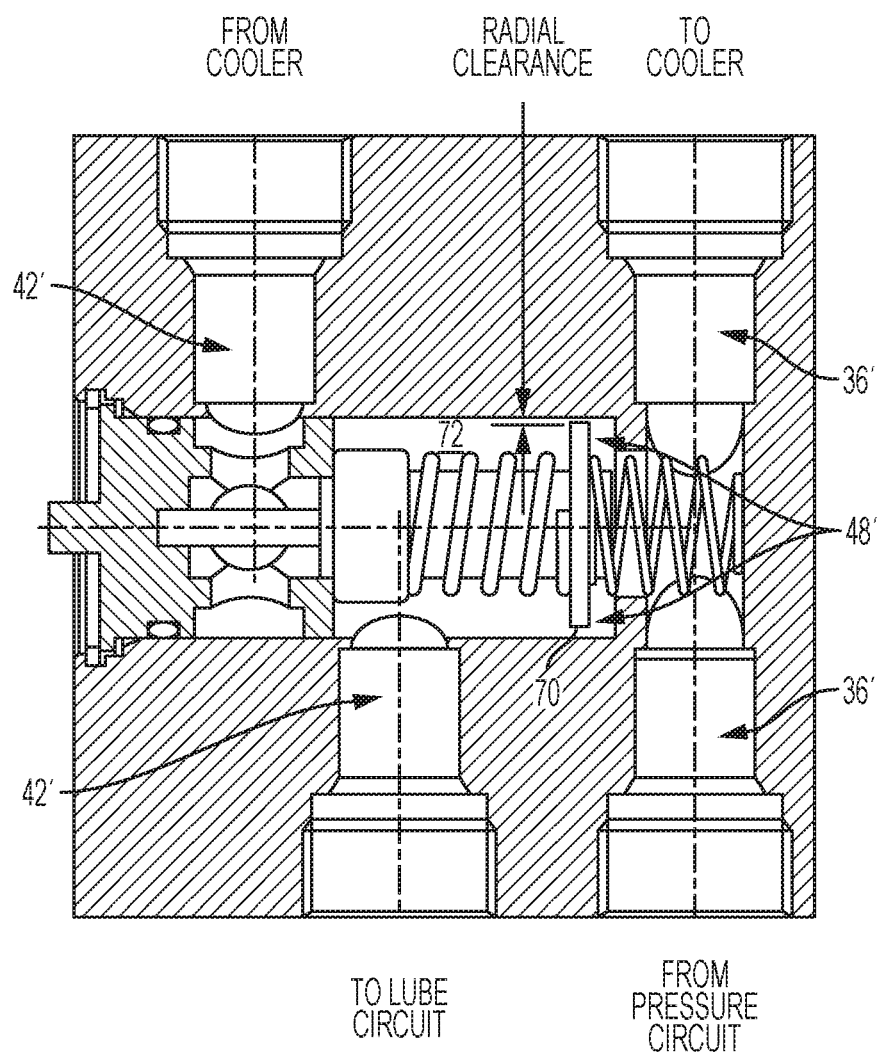
FIG. 6 is a diagram showing an alternate embodiment of a thermostatic bypass valve.

FIG. 6 shows an alternative embodiment when fluid is at normal operating temperature. In this embodiment, washer 70 moves within bore 72 in response to temperature changes, as sensed by a wax chamber. Bypass passageway 48', connecting the pressure circuit to the return circuit, includes the radial clearance between washer 70 and the wall of bore 72. This radial clearance is between 0.5 mm and 1.0 mm, which produces a desirable flow restriction between 10 and 20 psi for 10 liters per minute of flow at the viscosity of transmission fluid at normal operating temperature.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A transmission system comprising:
    a heat exchanger having a fluid loop with an inlet and an outlet, the heat exchanger having a first flow resistance;
    a valve body having a pressure circuit and a lubrication circuit; and
    a bypass valve connecting the heat exchanger to the valve body and configured to
        in response to a fluid temperature being equal to a first threshold, block flow from the outlet to the lubrication circuit and permit flow from the pressure circuit to the lubrication circuit via a bypass passageway with a second flow resistance that is greater than half of the first flow resistance, and
        in response to the fluid temperature exceeding a second threshold greater than the first threshold, block flow via the bypass passageway, fluidly connect the pressure circuit to the inlet, and fluidly connect the outlet to the lubrication circuit.

2. The transmission of claim 1 wherein the bypass passageway defines a radial clearance less than 1.0 mm.

3. The transmission system of claim 1 wherein the bypass valve is further configured to, in response to the fluid temperature being less than a third threshold less than the first threshold, decrease the flow resistance of the bypass passageway to less than the first flow resistance.

4. The transmission system of claim 1 wherein the bypass valve is further configured to, in response to a pressure difference between the pressure circuit and the lubrication circuit exceeding a pressure threshold while the fluid temperature exceeds the second threshold, permit flow through the bypass passageway.

5. The transmission system of claim 1 wherein the pressure circuit is a torque converter return circuit.

6. The transmission system of claim 1 wherein the bypass valve comprises a chamber containing wax formulated to have a melting point equal to the first threshold.

7. The transmission system of claim 6 wherein the chamber is thermally immersed in the pressure circuit.

8. A transmission system comprising:
    a pressure circuit;
    a lubrication circuit;
    a cooler; and
    a bypass valve configured to route fluid from the pressure circuit to the lubrication circuit via the cooler when a fluid temperature exceeds a temperature threshold and via a bypass passageway when the fluid temperature is less than the threshold, wherein the bypass passageway defines a fixed radial clearance less than 1.0 mm and wherein the bypass passageway has a flow resistance, when the fluid temperature is equal to the threshold, between 10 and 20 psi at a flow rate of 10 liters per minute.

9. The transmission system of claim 8 wherein the bypass passageway flow resistance, when the fluid temperature is equal to the threshold, is greater than half of a flow resistance of the cooler.

10. The transmission system of claim 8 wherein the bypass valve is further configured to decrease the flow resistance of the bypass passageway in response to the fluid temperature decreasing further below the threshold.

11. The transmission system of claim 8 wherein the bypass valve is further configured to, in response to a pressure difference between the pressure circuit and the lubrication circuit exceeding a pressure threshold while the fluid temperature exceeds the temperature threshold, permit flow through the bypass passageway.

12. The transmission system of claim 8 wherein the pressure circuit is a torque converter return circuit.

13. The transmission system of claim 8 wherein the bypass valve comprises a chamber containing wax formulated to have a melting point equal to the temperature threshold.

14. The transmission system of claim 13 wherein the chamber is thermally immersed in the pressure circuit.

15. A method of controlling a transmission comprising:
routing fluid to a lubrication circuit via a cooler in response to a fluid temperature exceeding a first threshold; and
routing fluid to the lubrication circuit via a bypass passageway in response to the fluid temperature being less than the first threshold, the bypass passageway having a flow resistance, when the fluid temperature is equal to the threshold, greater than half of a flow resistance of the cooler.

16. The method of claim 15 further comprising blocking fluid flow via the cooler in response to the fluid temperature being less than a second threshold less than the first threshold.

17. The method of claim 16 further comprising blocking fluid flow via the bypass passageway in response to the fluid temperature exceeding a third threshold greater than the first threshold.

18. The method of claim 17 further comprising routing fluid via the bypass passageway in response to a pressure difference between the pressure circuit and the lubrication circuit exceeding a pressure threshold while the fluid temperature exceeds the third threshold.

19. The method of claim 15 wherein the bypass passageway defines a fixed radial clearance less than 1.0 mm.

* * * * *